(12) United States Patent
Lee

(10) Patent No.: US 9,432,863 B2
(45) Date of Patent: Aug. 30, 2016

(54) OSCILLOSCOPE PROBEMEASUREMENT OF RADIO FREQUENCY TRANSMISSION USING CURVED BEAMSPLITTER AND DETECTOR HAVING OUTPUT CLAMPING CIRCUIT

(71) Applicant: Keysight Technologies, Inc., Minneapolis, MN (US)

(72) Inventor: Gregory S. Lee, Mountain View, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 414 days.

(21) Appl. No.: 13/870,353

(22) Filed: Apr. 25, 2013

(65) Prior Publication Data

US 2013/0285853 A1 Oct. 31, 2013

Related U.S. Application Data

(60) Provisional application No. 61/638,691, filed on Apr. 26, 2012.

(51) Int. Cl.
*H04B 17/00* (2015.01)
*H04W 24/08* (2009.01)
*H04W 16/28* (2009.01)

(52) U.S. Cl.
CPC ............ *H04W 24/08* (2013.01); *H04W 16/28* (2013.01)

(58) Field of Classification Search
CPC .............................. H04W 16/28; H04W 24/08
USPC ...................................................... 455/67.11
See application file for complete search history.

(56) References Cited

U.S. PATENT DOCUMENTS

| | | | |
|---|---|---|---|
| 6,469,672 B1 | 10/2002 | Marti-Canales et al. | |
| 7,773,205 B2 * | 8/2010 | Cooper | G01S 13/887 342/132 |
| 8,129,684 B2 * | 3/2012 | Mueller | G01N 21/3581 250/330 |
| 2006/0025178 A1 * | 2/2006 | Tao | H04B 7/0617 455/562.1 |
| 2007/0188683 A1 * | 8/2007 | Naka | G02F 1/133555 349/114 |

OTHER PUBLICATIONS

Rebeiz, "RF MEMS Switches: Status ofthe Technology", Transducers '03, 12th International Conference on SolidState Sensors, Actuators, and Microsystems, Boston, Jun. 8-12, 2003.
Krauss "Antennas", 2nd edition, McGraw-Hill, New York, Appendix A-10, Mar. 1988.
Rohacell—Making the world lighter. Datasheet [online]. Evonik Industries [retrieved on Apr. 20, 2016]. Retrieved from the Internet: <http://www.rohacell.com/sites/lists/PP-HP/Documents/ROHACELL-Making-the-world-lighter-EN.pdf>.
Antenna Measurement. Wikipedia entry [online]. Wikipedia.org [retrieved on Apr. 20, 2016]. Retrieved from the Internet: (http://en.wikipedia.org/wiki/Antenna measurement>.

* cited by examiner

*Primary Examiner* — Ajibola Akinyemi

(57) ABSTRACT

A system is provided for monitoring communication in a wireless network. The system comprises a sniffer device comprising a first antenna, and a beamsplitter having a curved shape and configured to reflect a portion of a beam transmitted by a second antenna toward the first antenna while transmitting a remaining portion of the beam toward a target.

20 Claims, 17 Drawing Sheets

OSCILLOSCOPE PROBE MEASUREMENT OF RADIO FREQUENCY TRANSMISSION USING CURVED BEAMSPLITTER AND DETECTOR HAVING OUTPUT CLAMPING CIRCUIT

CROSS-REFERENCE TO RELATED APPLICATIONS

The present application claims priority under 35 U.S.C. §119(e) from U.S. Provisional Patent Application No. 61/638,691 filed on Apr. 26, 2012. The entire disclosure of the referenced U.S. Provisional Patent Application No. 61/638,691 is specifically incorporated herein by reference.

BACKGROUND

Far-field pattern measurement is commonly used to characterize the behavior of antennas. Far-field pattern measurement typically comprises measurement of transmitted power at different angles (e.g., azimuth, elevation) within the far-field of an antenna, and is commonly used in antenna development and testing to ensure that the antenna meets desired performance specifications.

Far-field pattern measurement is typically performed in an anechoic chamber to ensure precision and reliability of the resulting data. An anechoic chamber, however, is generally large, expensive to construct, and expensive to operate. In addition, pattern acquisition time is typically extremely slow. For example, a single cut plane scan (e.g., constant azimuth or elevation angle) at a single frequency may take twenty minutes if measurements are performed at angular intervals of 1°. Moreover, during a test, an antenna designer may wish to measure the far-field pattern of an antenna at a number of frequencies and may want a more complete pattern characterization such as a spherical plot covering both azimuth and elevation angles. This capability requires multi-axis gimbaling, which many facilities lack. Furthermore, such a set of two dimensional (2D) pattern measurements may take days. As certified testing facilities may be expensive (e.g., $10,000 per day), this presents a serious financial barrier to iterative product development.

There are various alternatives to using an anechoic chamber. For example, some companies offer near-field pattern measurement systems whereby a receiver probe antenna is mechanically scanned across an antenna under test (AUT) and well-known mathematical techniques are used to convert the measurements into far-field data. However, one must still be careful to provide "anechoic-like" conditions. Accordingly, the near-field pattern measurement systems generally use one of three types of geometry for both scanning and an anechoic absorber layout, including planar, cylindrical, and spherical geometries. A significant benefit of near-field systems is their compactness relative to an anechoic chamber. However, due to the mechanical scanning, the near-field pattern measurements are still rather slow.

Due to high cost and slow performance, conventional approaches to far-field pattern measurement may be impractical for newer antenna technologies such as smart antennas. One reason for this impracticality is that smart antennas may need to be characterized under rapidly changing conditions to ensure proper performance in a real-world environment. For example, a smart antenna generally comprises an antenna array that can adapt its beam to handle obstructions or multipath communication, both of which may change frequently. In one example, a smart antenna and a receiver form a directional link that is temporarily blocked by an intervening obstacle such as a passing body or vehicle. To avoid the obstacle, the smart antenna may temporarily redirect its beam to bounce off of a wall and propagate to the receiver. This can be accomplished, for instance, by adjusting transmission characteristics of individual elements of the antenna array. One way to adjust these transmission characteristics is by specifying different weight vectors for the array elements to achieve different beam patterns.

Such adjustments may be required every few seconds or even milliseconds according to various changes in the environment. Accordingly, to ensure reliable operation, the antenna's far-field pattern may need to be characterized under these rapidly changing conditions. In other words, it may be insufficient to characterize a smart antenna under static measurement conditions because unexpected glitches or other phenomena may arise during dynamic operation. Conventional methods, however, are unable to measure 2D or even 1D antenna patterns with the speed required by a dynamic real-world environment.

Another reason conventional approaches to far-field antenna measurement may be impractical for smart antennas is that these types of antennas may need to be characterized with respect to a large number of transmitted patterns. Performing a large number of measurements, however, may require too much time with conventional approaches. For example, in a WiGIG/Wireless HD protocol there are forty eight transmitter weight vectors and forty eight receiver weight vectors to explore. Each weight vector represents a new pattern and the protocol actually asks for several rounds of exploration (iteration) before a new link is established.

In view of the above shortcomings of conventional technologies, there is a general need for faster approaches to far-field pattern measurement, especially for dynamic applications such as smart antennas.

SUMMARY

In accordance with a representative embodiment, a system configured to monitor communication in a wireless network. The system comprises: a sniffer device comprising a first antenna; and a beamsplitter having a curved shape and configured to reflect a portion of a beam transmitted by a second antenna toward the first antenna while transmitting a remaining portion of the beam toward a target.

In accordance with another representative embodiment, a method of monitoring communication in a wireless network. The method comprises: transmitting a beam comprising a radio frequency signal from a first device toward a target using a first antenna; reflecting a portion of the transmitted beam from a reflective pattern on a curved beamsplitter toward a second device comprising a second antenna while transmitting a remaining portion of the beam through the beamsplitter toward the target.

BRIEF SUMMARY OF THE DRAWINGS

The described embodiments are best understood from the following detailed description when read with the accompanying drawing figures. Wherever applicable and practical, like reference numerals refer to like elements.

DETAILED DESCRIPTION

Figure 1:
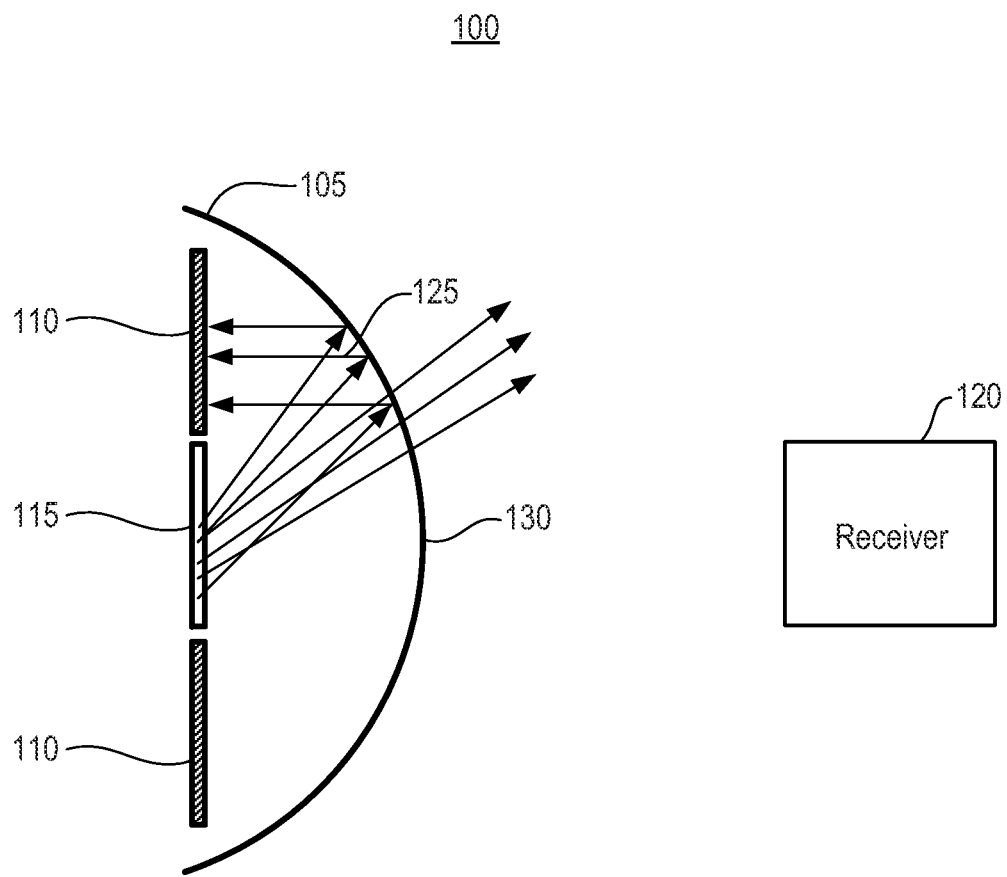
FIG. 1 is a cross-sectional diagram of a system for performing far-field pattern measurement on a smart antenna according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices. As used in the specification and appended claims, the terms 'a', 'an' and 'the' include both singular and plural referents, unless the context clearly dictates otherwise. Thus, for example, 'a device' includes one device and plural devices. As used in the specification and appended claims, and in addition to their ordinary meanings, the terms 'substantial' or 'substantially' mean to within acceptable limits or degree. As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to the detection of transmissions from smart antennas. For example, some embodiments relate to systems for performing far-field pattern measurement for smart antennas, while other embodiments relate to systems for snooping on smart antenna communications within a wireless local area network (LAN).

In certain embodiments, a system is configured to perform far-field pattern measurements on a smart antenna operating in a dynamic link configuration. The system can perform these measurements relatively quickly in order to characterize an antenna pattern even in a rapidly changing context. In addition, the system can perform these measurements without interfering with the dynamic link. For example, it can perform the measurements without being detected as an obstacle or multipath scatterer that could change the dynamic link configuration. The system can also perform measurements without the use of an anechoic chamber.

In certain embodiments, a system for performing far-field pattern measurements comprises a curved beamsplitter and an annular detector. During typical operation, a smart antenna is placed within a center portion of the annular detector, and it transmits a beam to a receiver located on an opposite side of the beamsplitter. The beamsplitter reflects a small portion of the beam toward the annular detector, and the annular detector detects the reflected portion to determine the far-field pattern of the smart antenna.

The beamsplitter is typically formed in the shape of a paraboloid, and the smart antenna is placed at the paraboloid's focus during testing. Accordingly, when a beam is transmitted from the smart antenna to the receiver, the reflected portion of the beam becomes collimated so it arrives at the annular detector in a substantially uniform direction, regardless of its original angle of transmission.

The beamsplitter typically comprises a reflective pattern with a relatively low fill-factor designed to allow most of the transmitted beam to pass through. For example, the beamsplitter may comprise metal dots covering a portion of its surface. Assuming the dots are larger than a wavelength of the transmitted beam e.g., with microwave/millimeter wave frequencies), the fill-factor may be about 20-25% to achieve 99% transmission of the transmitted beam. In general, the fill factor may be determined by a microwave engineer using standard electromagnetic (EM) simulation tools such as high frequency structural simulator (HFSS).

The annular detector typically comprises an array of broadside antennas configured to receive the reflected portion of the beam and to transmit it to an array of detectors. The broadside antennas can comprise, for instance, horns, custom patch antennas, stacked patches, or cavity-backed slot antennas. The detectors can comprise, for instance, diodes or switches coupled to corresponding addressing hardware and configured to transmit detected portions of the reflected beam to a computer for rendering as a far-field image.

By allowing far-field pattern measurement to be performed while the smart antenna is used in a dynamic link, the described embodiments can provide a more reliable characterization of the smart antenna's performance under normal operating conditions compared with conventional technologies. In addition, by allowing far-field pattern measurement to be performed without the use of an anechoic chamber or mechanical scanning, the described embodiments can be used to characterize a smart antenna more quickly and cost effectively than conventional technologies.

In various alternative embodiments, a beamsplitter is used in the context of a wireless LAN to snoop on communications from smart antennas. For example, in some embodiments, a LAN comprises a plurality of communication nodes (e.g., transceivers) that use smart antennas to perform directional communications. Each node is associated with a beamsplitter having the shape of a prolate ellipsoid. The node is located at a first focus of the ellipsoid and a snooping receiver is located at a second focus of the ellipsoid. In this configuration, the beamsplitter is able to partially reflect communications from the communication node to the snooping receiver, typically using metal dots similar to those of the paraboloid beamsplitter used to perform far-field pattern measurement. This allows the snooping receiver to monitor communications between different nodes, even if it is not located within the path of the communication beam.

Figure 2:
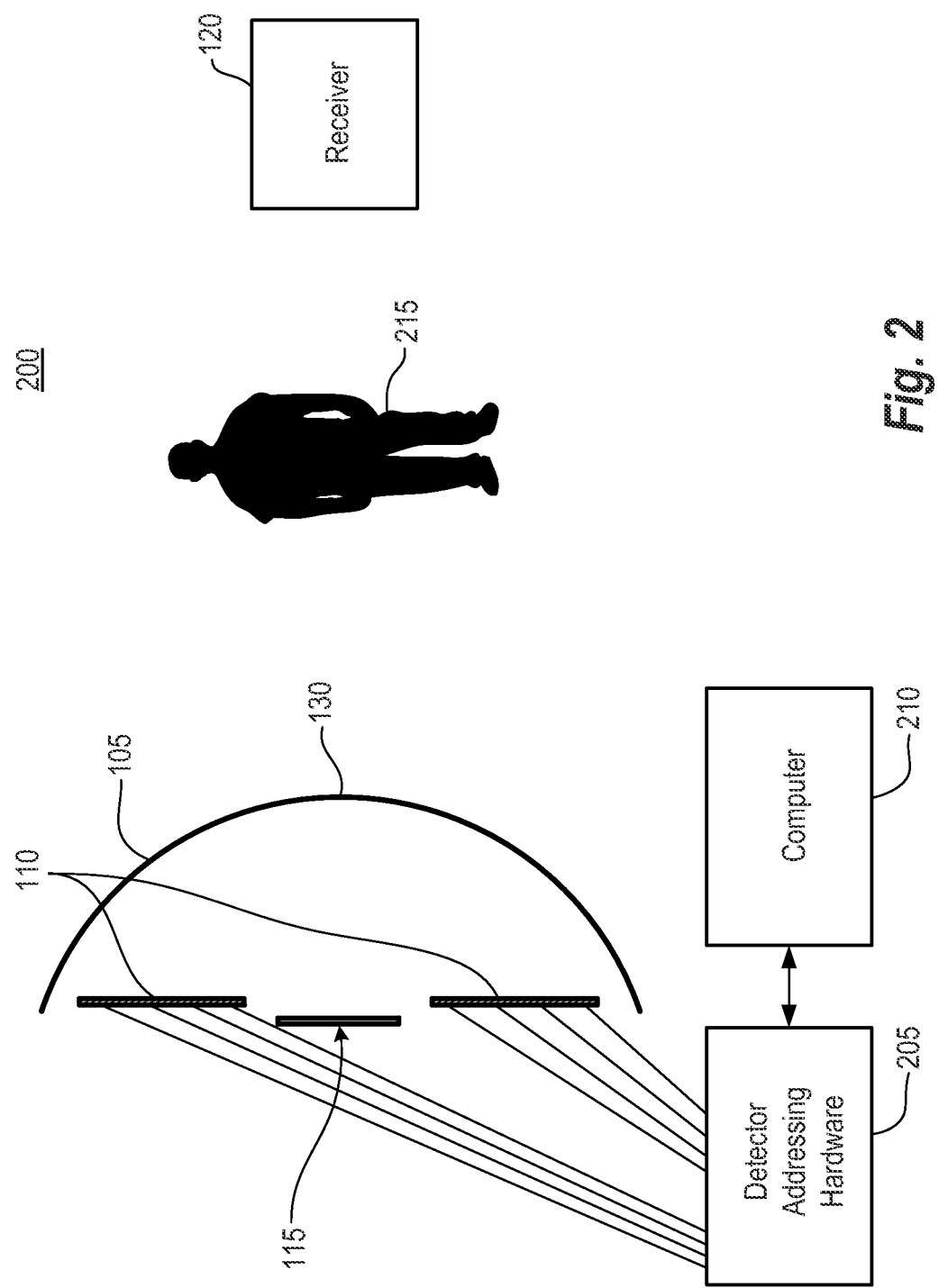
FIG. 2 is a cross-sectional diagram illustrating a system for performing far-field pattern measurement on a smart antenna according to a representative embodiment.

FIG. 1 is a cross-sectional diagram of a system 100 for performing far-field pattern measurement on a smart antenna according to a representative embodiment. For illustration purposes, FIG. 1 shows only some of the features that may be used to perform far-field pattern measurement, and FIG. 2 shows additional features, such as components for processing captured pattern measurements.

Referring to FIG. 1, system 100 comprises a beamsplitter 105, a detector array 110, a smart antenna 115, and a receiver 120. Smart antenna 115 is arranged in a plane with detector array 110, and it produces a beam 125 to be transmitted to receiver 120. Beam 125 typically comprises radio frequency (RF) signals in the millimeter-wave band.

Beamsplitter 105 has a curved shape in the form of a paraboloid. It is typically formed by placing a flex circuit on a surface having a paraboloid shape, such as a parabolic dome. The flex circuit typically comprises reflective elements with a small fill-factor in order to reflect only a small portion of beam 125 while allowing transmission of the remainder of beam 125.

During operation, beamsplitter 105 taps (i.e., reflects) the small portion of beam 125 and collimates the tapped portion back toward detector array 110. The tapping of beam 125 is performed independent of the beam's far-field angle and polarization. Examples of the tapped portion are shown by parallel arrows in the direction of detector array 110.

Mathematically, beamsplitter 105 can be characterized by a complex reflection coefficient ρ, which is independent of polarization and emission angle from smart antenna 115 and may have slowly varying frequency dependence. A transmitted (i.e., untapped) portion of beam 125 propagates beyond beamsplitter 105 with a complex transmission coefficient τ nearly unity and also independent of far-field angle and polarization. Examples of this transmitted portion are illustrated by arrows passing through beamsplitter 105. Both real and imaginary parts of τ are independent of the emission angle from smart antenna 115, so their ratio is also independent of the emission angle. This ensures that the pattern of beam 125 is unperturbed as it propagates beyond beamsplitter 105. In other words, no refraction (or "lensing") of beam 125 occurs at beamsplitter 105.

To the extent that beamsplitter 105 is lossless, the coefficients ρ and τ satisfy the following equation (1).

$$|\rho|^2+|\tau|^2=1 \quad (1)$$

Detector array 110 is formed as an annulus with a center opening or hole configured to receive smart antenna 115.

The function of detector array 110 is to image the tapped portion of beam 125, i.e., radiated power reflected by beamsplitter 105. With beamsplitter 105 located in or near the far-field of smart antenna 115, detector array 110 is located in a "folded" far-field of the smart antenna. The concept of folded far-field is familiar from so-called compact antenna test range (CATR) facilities, which use a parabolic mirror to bounce the radiation from an antenna to a receiver in order to save space. Because beamsplitter 105 is in the shape of a paraboloid, the tapped power is collimated onto detector array 110 in a spatial distribution that faithfully reproduces the radiation pattern impinging on beamsplitter 105.

A portion of the tapped power of beam 125 falls into the hole in detector array 110 and back onto smart antenna 115. However, if reflection coefficient ρ is small enough, it will have little or no adverse effect on smart antenna 115 because components surrounding smart antenna 115, such as its packaging, will likely produce a larger reflection. For example, if beamsplitter 105 is designed to act as a 20-dB coupler (|ρ|=0.1), any modern transmit amplifier would be unaffected. The "missed power" that falls into the hole in detector array 110 corresponds to radiation that impinged on an apex 130 of beamsplitter 105. Accordingly, it corresponds to a broadside component of the far-field of smart antenna 115. The missed power, however, can be recovered from information captured by detector array 110.

One way to recover the missed power is by interpolating or extrapolating the information captured by detector array 110. In general, the missed power results from a portion of beam 125 that is directed toward apex 130 and is tapped in such a way that the collimated reflected portion returns to smart antenna 115 through the hole in detector array 110. In contrast, where beam 125 is directed away from apex 130, the collimated power of beam 125 falls predominantly on detector array 110, so the amount of missed power is relatively small. Due to diffraction, however, some of beam 125 reflected off apex 130 spreads out over a larger area than the original aperture. The amount of this diffraction can be estimated from standard aperture theory.

As an example, suppose the hole in detector array 110 has a diameter of 1.5 cm. Because λ=0.5 cm at 60 GHz, a half-power beamwidth (FWHM) is 58°/(1.5/0.5)=19.3°. With detector array 110 having this size of hole, beamsplitter 105 can be configured with a diameter of about 14 cm, and a distance from the hole to apex 130 can be about 3.5 cm, for a folded axial distance of 7 cm. Under these conditions, the half-power diameter of the reflected portion of beam 125 is approximately the square root of $(1.5^2+(7*2*\tan(19.3°/2))^2)$, or about 2.8 cm.

Consequently, even where all antenna elements in smart antenna 115 are co-phased to radiate broadside towards apex 130, a significant fraction of the tapped, reflected power actually misses smart antenna 115 upon return and instead falls upon detector array 110. Most of this "annular apical" power falls on a fairly tight ring around the hole in detector array 110 if the paraboloid is relatively small, or it falls on a relatively large diffuse spot with a fractionally small central perforation if the paraboloid is large. In light of this observation, an interpolation or extrapolation algorithm can be used to infer a profile of the missed power. For example, a 2D interpolation algorithm can be used to interpolate power measurements (for incoherent detection) or complex voltage measurements (for coherent detection) of missing detector elements based on measured powers or complex voltages from the detectors in detector array 110 near the hole. The 2D interpolation algorithm can be implemented, for instance, using off the shelf software such as Matlab, custom software, or various types of hardware.

Under certain circumstances, voltage based (i.e., coherent) measurements are better suited to interpolation than power-only (i.e., incoherent) measurements. For example, suppose interpolation is performed on power-only measurements, where beam 125 is a vortex beam. A vortex beam has an annular power pattern and may be referred to as a non-zero orbital angular momentum (OAM) beam. Such a beam is generally less useful in WiGIG applications than simple re-directed beams where one just aims to one side of the obstacle and bounces off one wall. The reason is that the vortex beam must be recollected by a similar vortex process on the receive side of the link and the system must depend on all path lengths (bounces off the left wall, the right wall, the ceiling, and the floor) being equal or else destructive interference will greatly diminish the received signal. With voltage-based measurements, interpolation can be readily performed to recover missing amplitudes of vortex beams. This is because the phase of the vortex beam is also recorded and hence, the complex (real and imaginary) interpolation will establish the amplitudes and phases of the missing detectors without being fooled by the power-only beam profile.

In some embodiments, the number of interpolated values (or "missing detectors") corresponding to the hole is a relatively small number, e.g., about 4-9. This number of interpolated values can be used, for instance, where smart antenna 115 array is a 6×6 array with an element spacing of $\lambda/2$, with $\lambda$ representing a free-space wavelength of beam 125. Under these conditions, the "missing detector" spacing is typically $3\lambda/2$. Accordingly, a corresponding "missing detector" subarray is about 2×2 to 3×3.

FIG. 2 is a cross-sectional diagram illustrating a system 200 for performing far-field pattern measurement on a smart antenna according to a representative embodiment. System 200 is an expanded version of system 100, and it is shown in context with an obstacle that may occur in a real-world environment.

Referring to FIG. 2, system 200 comprises beamsplitter 105, detector array 110, smart antenna 115, and receiver 120. Smart antenna 115 is exposed through the hole in detector array 110 and is arranged close to a plane of detector array 110. System 200 further comprises detector addressing hardware 205 configured to measure received signal power or voltage of each detector in detector array 110, and a computer 210 configured to render an array of received signals into a far-field image.

An obstacle 215 in the form of a person is located between beamsplitter 105 and receiver 120. During typical operation, the presence of obstacle 215 may cause smart antenna 115 to adjust its beam direction. For example, smart antenna 115 may redirect its beam to go around obstacle 215, e.g., by pointing the beam toward a surface located to the side of obstacle 215 so it can bounce off the surface toward receiver 120. Consequently, the use of obstacle 215 allows simulation of real-world conditions during testing of smart antenna 115. In general, system 200 allows far-field pattern measurements to be performed relatively quickly on that the behavior of smart antenna 115 can be characterized even if its beam is dynamically adjusted due to an obstacle or another factor.

Figure 3:
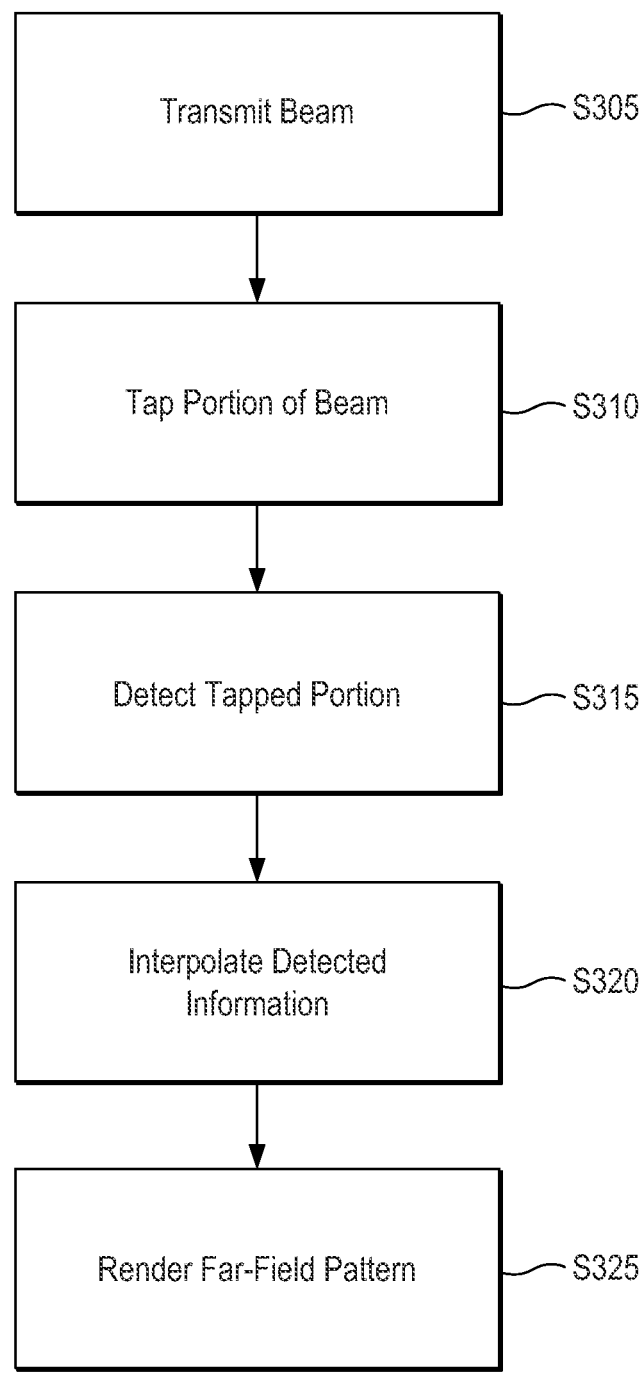
FIG. 3 is a flowchart illustrating a method of performing far-field pattern measurement of a smart antenna according to a representative embodiment.

FIG. 3 is a flowchart illustrating a method of performing far-field pattern measurement of a smart antenna according to a representative embodiment. In the description that follows, example method steps will be indicated by parentheses.

Referring to FIG. 3, a beam of millimeter-wave radiation is transmitted from a smart antenna array (S305). Next, a parabolic beamsplitter taps and collimates a portion of the transmitted beam (S310). This tapping is generally accomplished in a substantially uniform manner with regards to both polarization and emission angle of the smart antenna and it substantially avoids refraction of the transmitted beam. Next, the tapped portion of the transmitted beam is detected using a detector array surrounding the smart antenna (S315). The detected information is then interpolated to generate a representation of untapped portions of the transmitted beam (S320). Finally, the detected portion of the transmitted beam and the interpolated information are processed to render a far-field pattern of the smart antenna (S325). The method of FIG. 3 can be performed by a system such as that illustrated in FIG. 2 or other suitable components. A variety of alternative components and operations that can be used for the method of FIG. 3 will be apparent from the description of FIGS. 1 and 2, as well as the description below.

Figure 4:
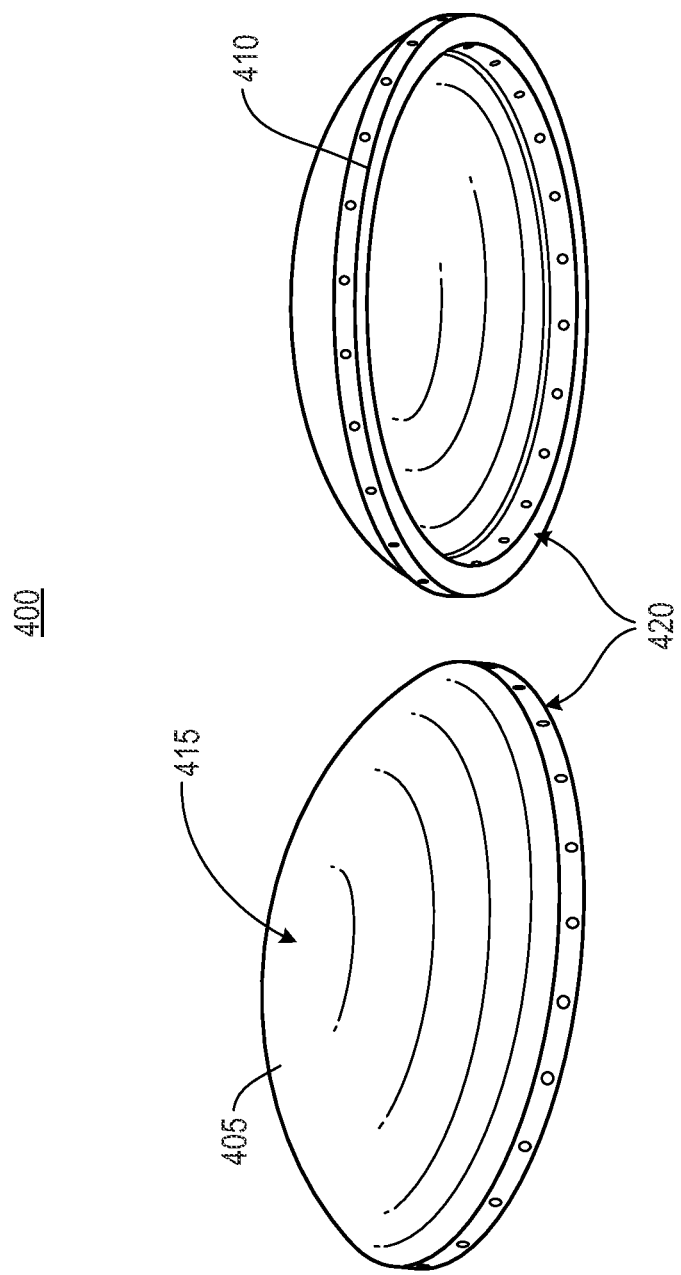
FIG. 4 shows an example of a parabolic dome for a beamsplitter according to a representative embodiment.

FIG. 4 shows an example of a parabolic dome 400 for a beamsplitter according to a representative embodiment. Parabolic dome 400 can be used, for instance, to provide shape and structural support for beamsplitter 105 of FIGS. 1 and 2. As an example, in some embodiments, beamsplitter 105 is formed by placing a flex circuit over a surface of parabolic dome 400 to tap the power emitted by smart antenna 115.

Referring to FIG. 4, the left side of the diagram shows a first view of parabolic dome 400, and the right side of the diagram shows a second view of parabolic dome 400. The first view shows a convex outer surface of parabolic dome 400, and the second view shows a concave inner surface of parabolic dome 400.

Parabolic dome 400 comprises a foam shell 405 and a rim 410. Foam shell 405 is generally designed of a material that electromagnetically mimics air in order to avoid refractive distortion of a beam emitted from a smart antenna. Foam shell 405 can comprise, for instance, a machinable closed cell material such as Rohacell® or a comparable material. Alternative materials include, for instance, Styrofoam or polyethylene foam. These materials, however, are generally not considered machinable, so their shape may be cast or sculpted with a hot-wire cutter. Another alternative material is Rohacen®, which comprises polymethacrylamide (PMI) foam, a type of machinable foam often used for various purposes in the antenna industry. Specifically applicable materials include Mina IG 31 and IG 31-F, which are relatively light weight and may be less expensive than other types of foam due to their lower density.

Foam shell 405 is typically formed by machining a raw piece of material to create the hollowed out shape shown on the right side of FIG. 4. Although foam shell 405 is shown with a hollowed out shape, it could alternatively be formed in a filled (i.e., non-hollow) configuration. Nevertheless, the hollowed out dome has been shown to perform better than a filled dome in certain experiments. A flex circuit can be placed over foam shell 405, with the center of the flex circuit located at an apex 415.

Rim 410 can be formed integral to foam shell 405, or it can be formed of a separate rigid material that does not interfere with electromagnetic communication. Rim 410 contains screw holes 420 that can be used to secure the flex circuit to foam shell 405. For example, nylon screws can be inserted into screw holes 420 to securely attach the edges of the flex circuit to foam shell 405. A secure attachment between the flex circuit and rim 410 can prevent the flex circuit from puckering on the surface of foam shell 405. In addition, the use of screws may eliminate a need to glue or otherwise attach the flex circuit to the surface of foam shell 405. Although screws may be superior to glue or other adhesives in various contexts, the flex circuit could nevertheless be attached to foam shell 405 using an adhesive in some embodiments.

Figure 5:
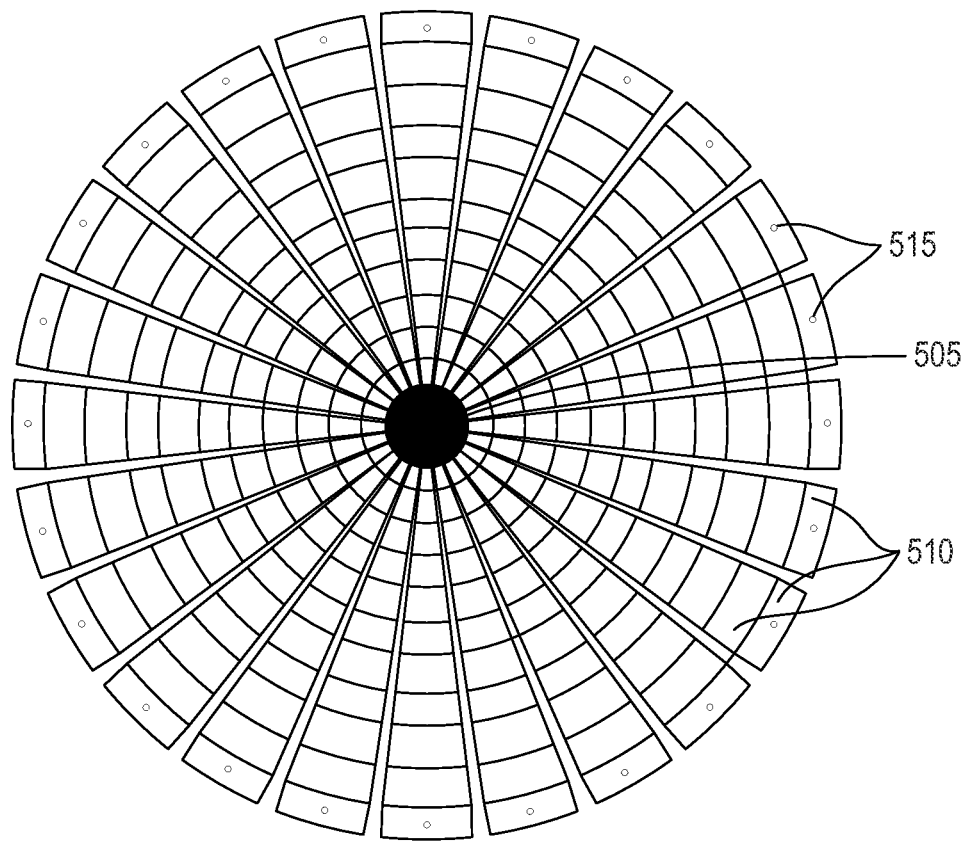
FIG. 5 shows an example of a flex circuit for a parabolic beamsplitter according to a representative embodiment.

FIG. 5 shows an example of a flex circuit 500 for a parabolic beamsplitter according to a representative embodiment. In FIG. 5, flex circuit 500 is shown in a flat form as produced by a flex circuit vendor and has a cutout shape of a "sunburst". Flex circuit 500 is typically used in conjunction with a support structure such as parabolic dome 400 to form beamsplitter 105. For example, flex circuit 500 can be attached to the convex surface of parabolic dome 400 and fastened to rim 410 using screws.

Referring to FIG. 5, flex circuit 500 comprises a substrate formed of an ultrathin (e.g., 1 mil or less) polyimide layer without a ground plane. Flex circuit 500 comprises a central portion 505, referred to as a "sun", and plurality of arms 510 having edges that are slightly curved to accommodate a paraboloid shape. In the example of FIG. 5, flex circuit 500 has twenty-four arms, but other numbers are possible. In the example of FIG. 1, beamsplitter 105 can be formed by placing the "sun" 505 over apex 130 when attaching flex circuit 500 to foam shell 405, During typical operation, flex circuit 500 is arranged in a paraboloid configuration and a smart antenna (e.g., smart antenna 115) is placed in the focus of the paraboloid. With this configuration, rays emitted from the smart antenna 115 toward the "sun" are close to normal incidence and rays impinging on the ends of the arms are incident at 45°. Most of the transmitted rays pass through flex circuit 500 so they can be detected by the user's receiver. A small portion of the rays, however, are reflected off of flex circuit 500 and then travel toward an annular detector surrounding the smart antenna 115. The reflected rays are detected in order to determine the far-field pattern of the smart antenna 115.

As indicated above, flex circuit 500 may be attached to a support structure such as parabolic dome 400 to maintain a paraboloid shape. With parabolic dome 400, this attachment can be accomplished through the use of nylon screws, which avoids having to glue flex circuit 500 to the foam. Typically, one or two nylon screws are used to attach each arm of flex circuit 500 to rim 410. Examples of holes for the nylon screws are shown by the labels 515 in FIG. 5, Hex circuit 500 can also be attached to a support structure by an adhesive such as glue. However, where flex circuit 500 is attached to a dome using an adhesive, it may be difficult to avoid edge pucker of more than 0.5 mm, which is approximately λ/10 at 60 GHz, while also preventing the arms from bunching or adhering to each other. The nylon screws avoid both of these problems these by holding the arms against the dome without puckering and automatically space the arms evenly.

Flex circuit 500 comprises reflective elements that allow it to reflect a small portion of millimeter-wave power transmitted by the smart antenna. In some embodiments, these reflective elements comprise metal (or other suitable reflective material) dots (e.g., copper dots) patterned on one side of flex circuit 500. A fill-factor of the metal dots determines the amount of millimeter-wave power that is transmitted and reflected by flex circuit 500. For example, assuming the dots are larger than a wavelength of the transmitted beam (e.g., with microwave/millimeter wave frequencies), a fill-factor of about 20-25% may achieve 99% transmission of the transmitted beam for a 20 dB coupler. The fill factor may be determined by a microwave engineer using standard EM simulation tools such as HFSS.

Figure 6A:
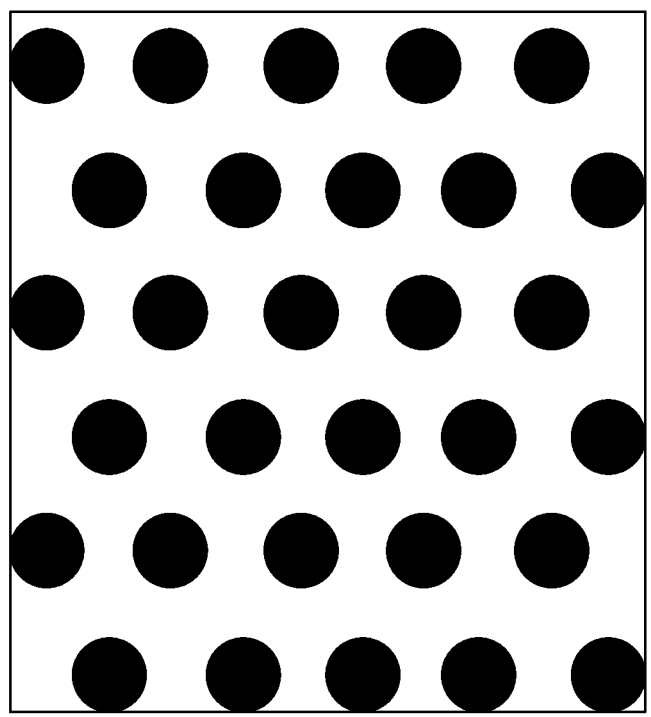
FIGS. 6A-6C show three different configurations of metal dots formed on a flex circuit according to a representative embodiment.
Figure 6B:
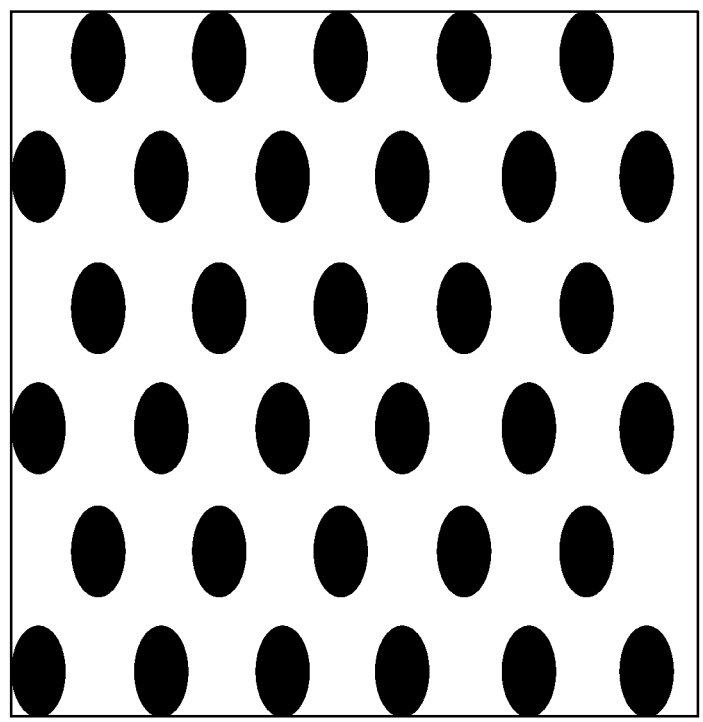
Figure 6C:
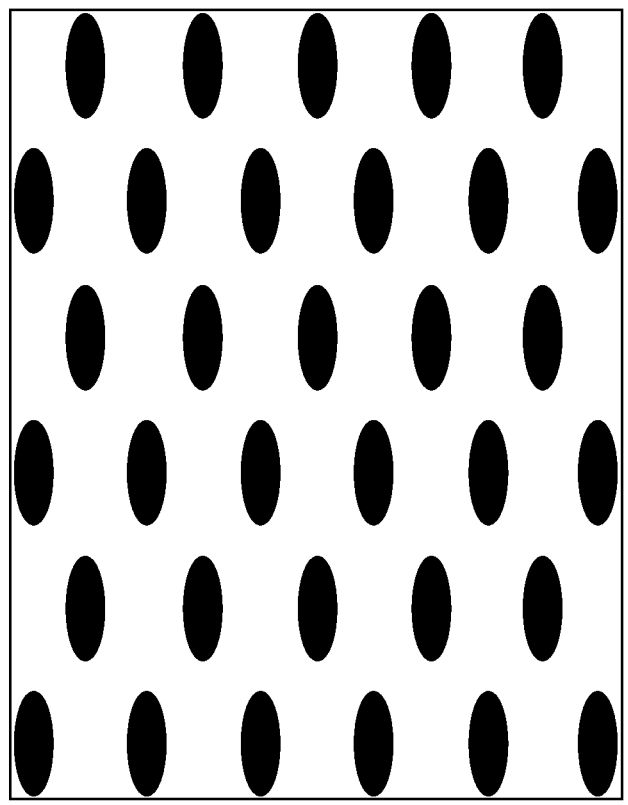

FIGS. 6A-6C show three different configurations of metal dots formed on a flex circuit according to a representative embodiment. For explanation purposes, it will be assumed that the metal dots of FIGS. 6A through 6C are formed on different portions of flex circuit 500. Although metal dots are described above with reference to FIGS. 6A-6C, other materials or geometries, for example a grid of metal wires, could be used to form reflective elements on flex circuit 500, as will be appreciated by those skilled in the art.

As illustrated in FIG. 6A, metal dots having a circular shape are formed in the "sun" of flex circuit 500. As illustrated in FIG. 6B, copper dots having an elliptical shape are formed in the anus of flex circuit 500. As illustrated in FIG. 6C, copper dots having a highly elliptical shape are formed near the ends of the arms of flex circuit 500.

The copper dots in FIGS. 6A-6C are arranged in a hexagonal lattice. Alternatively, they could be formed with other lattice configurations, such as a rectangular lattice configuration. The lattice period is much smaller than the free-space wavelength λ, so the array of dots acts like a "meta-surface".

As illustrated by FIGS. 6A-6C, the metal dots become more elliptical (or more "eccentric") as they are located closer to the ends of the arms of flex circuit 500. A long axis of each ellipse parallels the arm itself. In other words, the long axis of each ellipse runs along a long axis of the corresponding arm.

The spatial gradation of dot ellipticity compensates for a tendency of the two polarizations (s and p) to experience different reflection as the incident angle departs from normal. In particular, if only a dielectric film were to be used for beamsplitting, p polarization would tend to reflect less as the Brewster's angle is approached while s polarization would tend to reflect more. The elliptical dots introduce a surface anisotropy to address this divergence.

Figure 7:
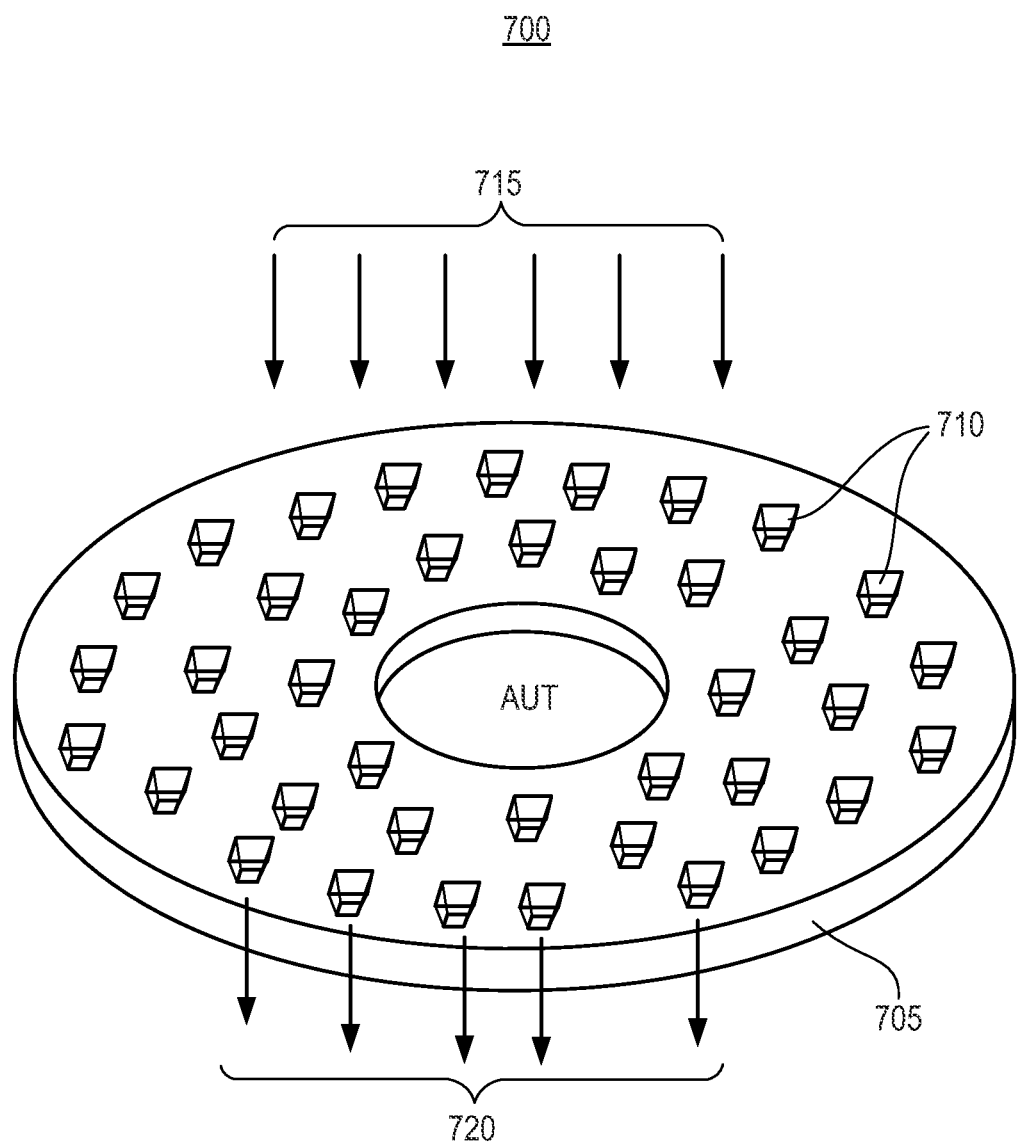
FIG. 7 is a diagram illustrating a detector array according to a representative embodiment.

FIG. 7 is a diagram illustrating a detector array 700 according to a representative embodiment. For explanation purposes, it will be assumed that detector array 700 is used in the context of system 200 of FIG. 2. More specifically, it will be assumed that detector array 700 is used to implement detector array 110.

Referring to FIG. 7, detector array 700 comprises an annulus 705 formed by a metalized mold or a machined disk. A plurality of broadside antennas 710 are formed in a surface of annulus 705 around a center hole, and the center hole is configured to receive a smart antenna 115 (labeled AUT, for antenna under test) during far-field pattern measurement.

Broadside antennas 710 comprise tapered apertures (i.e., "horns") that respond directionally to incoming normal incidence radiation while suppressing responses to stray sideways leakage power that may escape smart antenna 115 laterally along its package wall. Broadside antennas 710 are connected at their narrower ends to detectors configured to sense power incident on annulus 705.

During operation of system 200, collimated rays 715 arrive at detector array 700 after being tapped from beam 125 by beamsplitter 105. Broadside antennas 710 collect and convey the collimated rays 715 to their detectors, in a direction indicated by arrows 720.

The detectors typically comprise Schottky diodes, although detector array 700 is not limited to any specific type of detector. The Schottky diodes are available in small (so-called 0201) surface mount packages, and they can be purchased at relatively low-cost. The 0201 packages are generally intended for use with frequencies up to 30 GHz, but they may perform reasonably at frequencies up to 60 GHz.

Different configurations of Schottky diodes can be used according to whether detector array 700 is to perform incoherent detection (power only) or coherent detection (voltage). For example, single Schottky diodes can be used for incoherent detection, and subharmonic mixers using antiparallel Schottky diodes can be used for coherent detection. The antiparallel diodes are available in a single so-called 0302 package, and they can be used with a local oscillator (LO) frequency in a range of, e.g., 30 GHz.

Broadside antennas 710 are typically designed to cut off frequencies below a predetermined threshold 45 GHz) in order to suppress LO radiation. One way to manufacture and assemble broadside antennas 710 is by stamp cutting (or more generally, 3-dimensional (3D) machining) them out of single piece of metalized molded plastic. Hollows can be designed into the plastic to provide clearance over surface mount parts and electrical lines that should not be shorted. The entire metal annular part (array of horns) can then be aligned to a printed circuit comprising the detectors and connected to the printed circuit by solder reflow.

As an alternative to the horns shown in FIG. 7, broadside antennas 710 could be formed of multi-patch or multi-slot antennas. These types of antennas typically have higher gain but lower bandwidth compared with the antennas of FIG. 7. Consequently, it may be difficult to cover an entire worldwide WiGIG band of 57-67 GHz (US, European, and Japanese definitions) with multi-patch or multi-slot antennas.

Because detector array 700 is intended to receive collimated (broadside) millimeter waves tapped by a beamsplitter, it can be much less dense than atypical (e.g., sidelobe-free) phased array. Consequently, rather than $\lambda/2$ element spacing, which might be used in a smart antenna itself, the detector element spacing could be closer to $1.5\lambda$, for example. This can potentially reduce cost and increase image speed because the detector element count may be much tower than for a phased array. For example, with the detector element spacing increased from $\lambda/2$ to $1.5\lambda$, the detector element count can be reduced by 9× compared with a phased array. Atypical detector array count may have about 256 detector elements and provide an angular resolution of about 6°. Higher resolution could be obtained with more elements and/or a larger beamsplitter, but this amount of resolution is quite adequate for short-range smart beam applications.

Radiation from smart antenna 115 is typically polarized, as is a typical antenna or horn-coupled detector array. With higher density and expense, one could use dual-polarization horns and double the number of detectors in order to sense both polarizations simultaneously. More economically, one could simply rotate annulus 705 by 90° to receive the other polarization.

Figure 8:
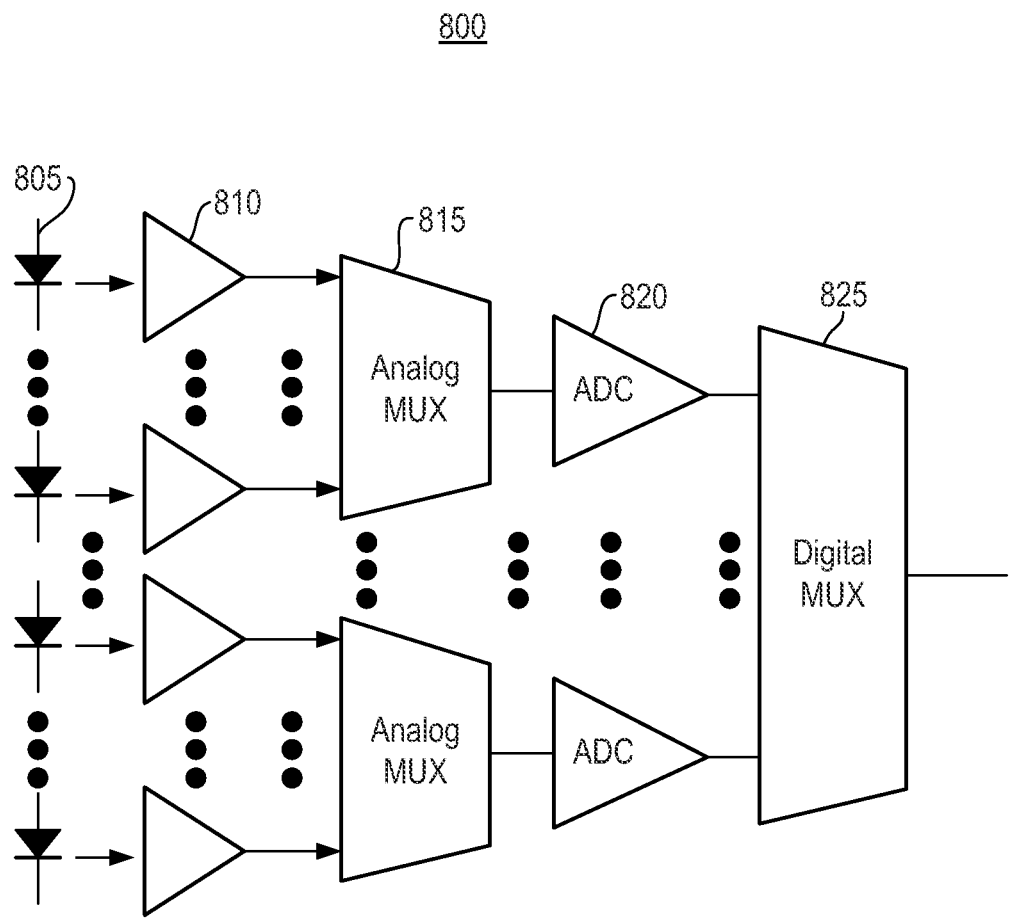
FIG. 8 is a circuit diagram illustrating detector addressing hardware according to a representative embodiment.

FIG. 8 is a circuit diagram illustrating detector addressing hardware 800 according to a representative embodiment. Detector addressing hardware 800 is used for incoherent detection of millimeter-wave power. For explanation purposes, it will be assumed that detector addressing hardware 800 is used in the context of system 200 of FIG. 2. More specifically, it will be assumed that detector addressing hardware 800 is used to implement detector addressing hardware 205.

For an incoherent detector of millimeter-wave power, a time constant of interest is a beam convergence time, which is a time required for a smart antenna to establish a new "final" beam. Typically, this time is hundreds of microseconds in the WiGIG/Wireless HD protocols. For a detector array with about 256 detector channels, this is slow enough that every channel can be equipped, at reasonable cost, with an operational amplifier (op-amp) having input access to an analog-to-digital converter (ADC). This can be accomplished, for instance, using multi-op amp and analog-multiplexed ADC chips, which are available off the shelf. The completion of the video detector addressing then comprises digital multiplexing of the ADC outputs, as illustrated, for instance in FIG. 8.

Referring to FIG. 8, detector addressing hardware 800 receives input signals through a 2D array of detector diodes 805 connected to broadside antennas of detector array 110. Detector diodes 805 transmit the input signals to op-amps 810, where they are amplified and transmitted to analog multiplexers 815. Analog multiplexers 815 then selectively transmit the amplified input signals to ADCs 820, where they are digitized and transmitted to a digital multiplexer 825. Finally, multiplexer 825 selectively outputs the digitized signals to computer 210. Analog multiplexers 815 and digital multiplexer 825 are both controlled according to addresses of detector diodes 805 in order to capture far-field pattern measurements in a specified order.

Coherent detection can be performed as an alternative to the incoherent detection described above. Coherent detection, however, may be more challenging. At present, 60 GHz fundamental mixers are generally too expensive to replicate in a large number of detectors, such as the approximately 256 detectors in the example of detector array 700. High performance 60 GHz switches have been demonstrated in research using MEMS technology, but this technology is not available in packaged form at these frequencies, is not offered commercially at these frequencies, and is relatively expensive, e.g., $100 per single-pole, double-throw (SPDT), even at lower frequencies.

Subharmonic mixing (e.g., with an LO frequency around 28-30 GHz) may be possible at relatively low cost using antiparallel n-type silicon Schottky diodes in 0302 surface mount packages. For the LO frequency range of 28-30 GHz, for instance, there are various commercial options in packaged solid-state switching, especially for banded performance. Examples of such switches include PIN and FET based switches. Nevertheless, the use of these switches may be problematic because a binary switching tree of 1:256 is generally lossy and expensive, and it may require a large number of microwave processing elements.

Figure 9:
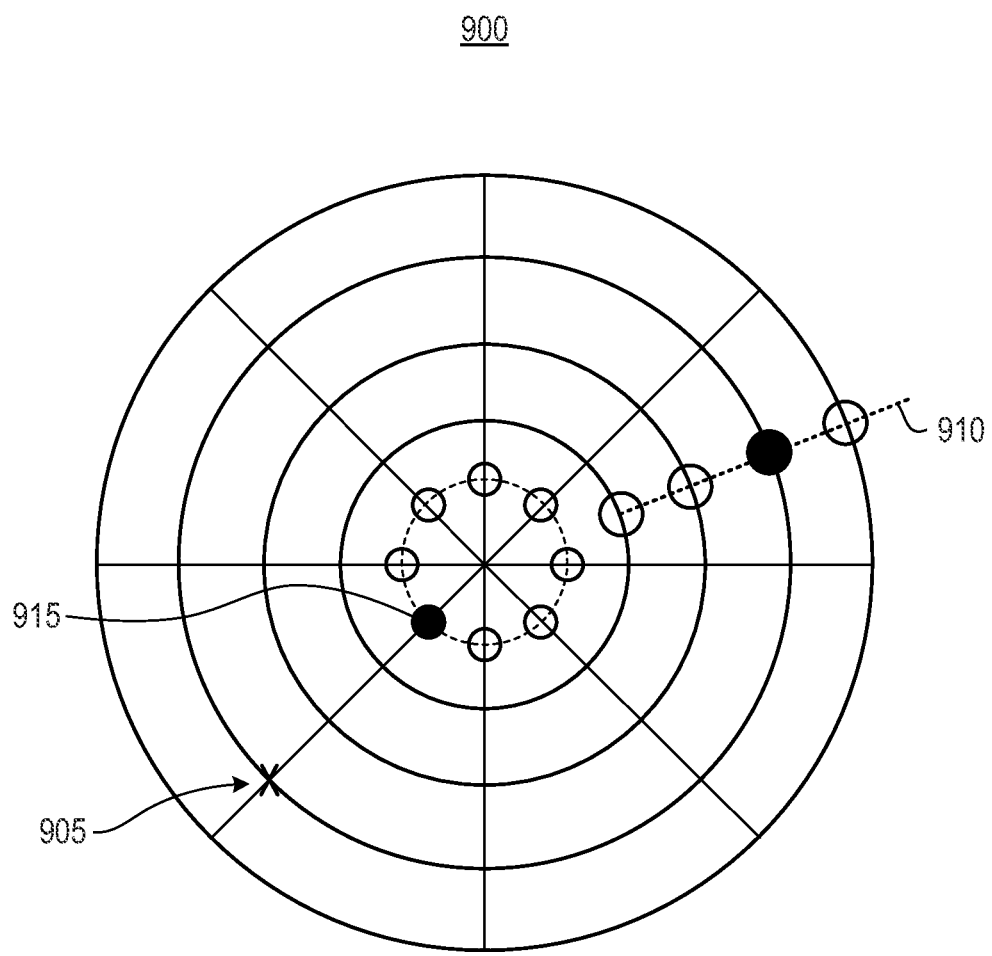
FIG. 9 is a diagram illustrating an addressing scheme used for coherent detection of millimeter-wave power according to a representative embodiment.

FIG. 9 is a diagram illustrating an addressing scheme used for coherent detection of millimeter-wave power according to a representative embodiment More specifically, FIG. 9 shows an arrangement of mixers on a detector array 900 using the addressing scheme. Detector array 900 can be used, for example, to implement detector array 110 of FIG. 2.

The addressing scheme of FIG. 9 can be referred to as "crossed addressing" or local oscillator (LO) by intermediate frequency (IF) ("LO×IF") addressing. In one example of this addressing scheme, the azimuthal location of a mixer is determined by LO switching, and the radial location of the mixer is determined by IF switching another example of this addressing scheme, the azimuthal location of a mixer is determined by IF switching, and the radial location of the mixer is determined by LO switching.

Referring to FIG. 9, detector array 900 comprises a plurality of mixers arranged on concentric circles and at distinct azimuth angles. A selected mixer 905 is located in a third circle indicated by a solid black dot along a radius selection line 910, and at an azimuth angle 225° indicated by a solid dot among a set of possible azimuth angles 915.

In general, each of the mixers can be uniquely identified by a radius and azimuth angle, where the radius indicates the circle in which it is located, and the azimuth angle indicates its location on the circle. In other words, the cross product of LO×IF defines a unique mixer address. For example, if there are 16 azimuths and 16 radii, unique addressing can be established with a 1:16 LO switching tree and a 16:1 IF switching tree. Accordingly, the switch count scales as the square root of the mixer count instead of linearly. As an alternative to the arrangement illustrated in FIG. 9, if the configuration of mixers or the geometry of detector array 900 were rectangular, the mixers could be addressed using rows and columns rather than radii and azimuth angles.

The addressing scheme of FIG. 9 allows the LO to be routed to a single azimuth (or radius) instead of all the way to a single mixer. It also allows each mixer to receive the IF (intermediate frequency) from a single radius (or azimuth). Additionally, this addressing scheme does not require LO switches to exhibit low insertion loss for the IF and vice versa, which is beneficial in light of limited availability of packaged switches (even in MEMS technology) with low insertion loss from DC-30 GHz. Using two types of switches has the additional benefit that the rejection by each type of switch of the other switch's band automatically improves LO-IF isolation. The requisite LO power generally increases with the square root of the detector count. However, this is nevertheless superior to LO-driving all mixers simultaneously, i.e., without any LO switching, whereby the requisite LO power would increase linearly with the detector count.

As indicated by the foregoing, the representative embodiments may provide various benefits compared with conventional technologies. For instance, some embodiments allow far-field pattern measurements to be performed in situ, i.e., under normal operating conditions. Accordingly, they avoid a need to use an anechoic chamber. In addition, some embodiments allow fast, all electronic imaging of a hemisphere of radiation without mechanical rotation or steering.

Certain embodiments also allow measurements to be obtained with minimal interference to the antenna beam pattern by weakly and uniformly sampling the beam using a curved beamsplitter white transmitting 99% of the beam without amplitude or phase distortion as a function antenna far-field angle or polarization. Accordingly, the far-field pattern as experienced by the rest of the link is the same as it would be in the absence of the curved beamsplitter.

Certain embodiments allow a mixer array to be used to detect tapped power for far-field pattern measurement and to perform radio functions associated with coherent detection. For example, a user studying the modulation properties of the transmitted beam can first find a "hot spot" location within the mixer array by identifying the largest IF signal among the mixer addresses. Then, the user can fix the LO×IF address to that one mixer location and operate as a coherent receiver, with the usual signal analysis applied to that one mixer channel.

In addition to far-field pattern measurement as described above, a variation of the curved beamsplitter concept can also be used for angle-independent and polarization-independent "snooping" or "sniffing" in wireless LAN protocols that allow beamsteering. Such airwave sniffing is commonly performed at frequencies below 6 GHz to confirm interoperability different wireless manufacturers' devices operating on a common wireless LAN. The purpose of this sniffing is to determine whether all transmitting devices are behaving in a desired manner, e.g., whether they are obeying an established communication protocol.

At lower frequencies where manufacturers' device antennas are substantially omnidirectional, a sniffer can simply be another omnidirectional antenna somewhat centrally located in the cell, connected to a receiver. In other words, it can function as a downconverter and demodulator to convert all of the broadcast signals to their baseband representation. A packet and protocol analyzer such as Wireshark can then be used to determine whether each RF component is obeying protocol.

At 60 GHz and shorter millimeter-wave frequencies where highly directional antennas (e.g., smart antennas) are employed, the above approach fails. Many of the communications may be peer-to-peer whereby a transmitter device "A" points its beam directly at a receiver device "B", and a "central" sniffer antenna is entirely outside the beam. Because there is no way a priori to determine which direction or directions a smart transmitter antenna may be pointing its beam at any given time, and there may be a number of different transmitters in the cell, a sniffing solution can be used as shown in FIG. 10.

Figure 10:
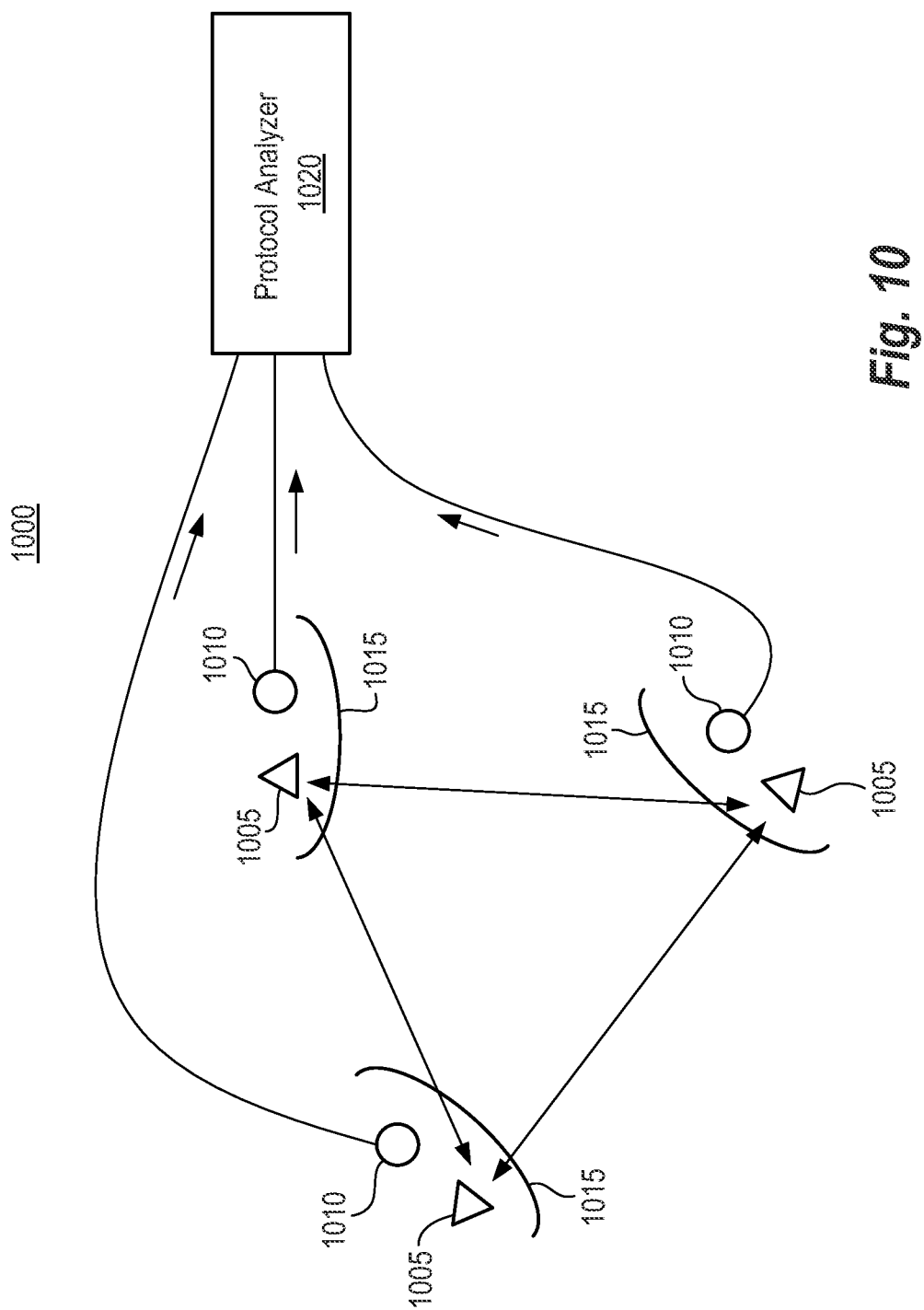
FIG. 10 shows a directional antenna network with non-perturbing sniffer devices according to a representative embodiment.

FIG. 10 shows a directional antenna network 1000 with non-perturbing sniffer devices according to a representative embodiment. For explanation purposes, the non-perturbing sniffer devices will be referred to as part of directional antenna network 1000. Nevertheless, the sniffers can exist apart from a directional antenna network, and they are typically provided as an add-on to an existing directional antenna network.

Referring to FIG. 10, directional antenna network 1000 comprises a plurality of network nodes and a (protocol analyzer 1020. Each of the network nodes comprises a first device 1005 comprising a smart antenna, a second device 1010 (or sniffer device) comprising an omnidirectional antenna, and a curved beamsplitter 1015. Each second device 1010 can be referred to as anon-perturbing sniffer device because it performs a sniffing function on transmissions from a corresponding first device 1005 without substantially interfering with the transmission. For illustration purposes, each first device 1005 is represented symbolically by a triangle and each second device 1010 is represented symbolically by a circle.

Each curved beamsplitter 1015 has the shape of a prolate ellipsoid, i.e., a 3D version of an ellipse. The ellipsoid has two foci, each lying on a major axis. One focus is located at the corresponding first device 1005, and the other focus is located at the corresponding second device 1010.

The prolate ellipsoid surface has the property that any geometric optical ray drawn from one focus to a point on the surface will reflect to the other focus. Accordingly, a portion of energy transmitted from the directional antenna within each first device 1005 is reflected off of the corresponding curved beamsplitter 1015 to the corresponding second device 1010. In other words, in contrast to the paraboloid design illustrated in FIGS. 4 and 5, where most of the transmitted power (e.g., 99%) passes through the beamsplitter without distortion and a small amount (e.g., 1%) is reflected and collimated, the ellipsoid design of FIG. 10 reflects and refocuses a portion of the transmitted power to a sniffing antenna.

The omnidirectional antenna in each second device 1010 performs a sniffing function and can be referred to as a sniffer antenna. The sniffer antenna is connected to a downconverting receiver, which converts a radio broadcast down to baseband bits. The baseband packets are then retransmitted over a simple wired star network to protocol analyzer 1020.

Each curved beamsplitter 1015 can be constructed in a manner similar to beamsplitter 105 as described and illustrated in relation to FIGS. 1, 4, and 5. For example, it can be constructed by machining a hollow shell of foam, such as Rohacell®, into the prolate ellipsoidal shape, and then placing a flex circuit with elliptical and/or circular metal dots over the shell. The sizes and density of the metal dots can be adjusted to control a beamsplitter ratio of each curved beamsplitter 1015.

Similar to the metal dots illustrated in FIGS. 6A-6C, the ellipticity (or eccentricity) of metal dots on curved beamsplitter 1015 may vary according to their location in order to compensate for a tendency of the two polarizations (s and p) to experience different reflection from a dielectric film as a beam's incident angle departs from normal. However, due to its shape, the prolate ellipsoid generally has a different distribution of eccentricities compared to a paraboloid. For example, in FIGS. 6A through 6C, a paraboloid dome has metal dots that are circular near the apex of the dome and become more eccentric towards the rim of the dome. The prolate ellipsoidal dome has no apex, however, so its distribution of eccentricities varies from that of the paraboloid dome, as illustrated, for example, in FIGS. 11 and 12.

Figure 11:
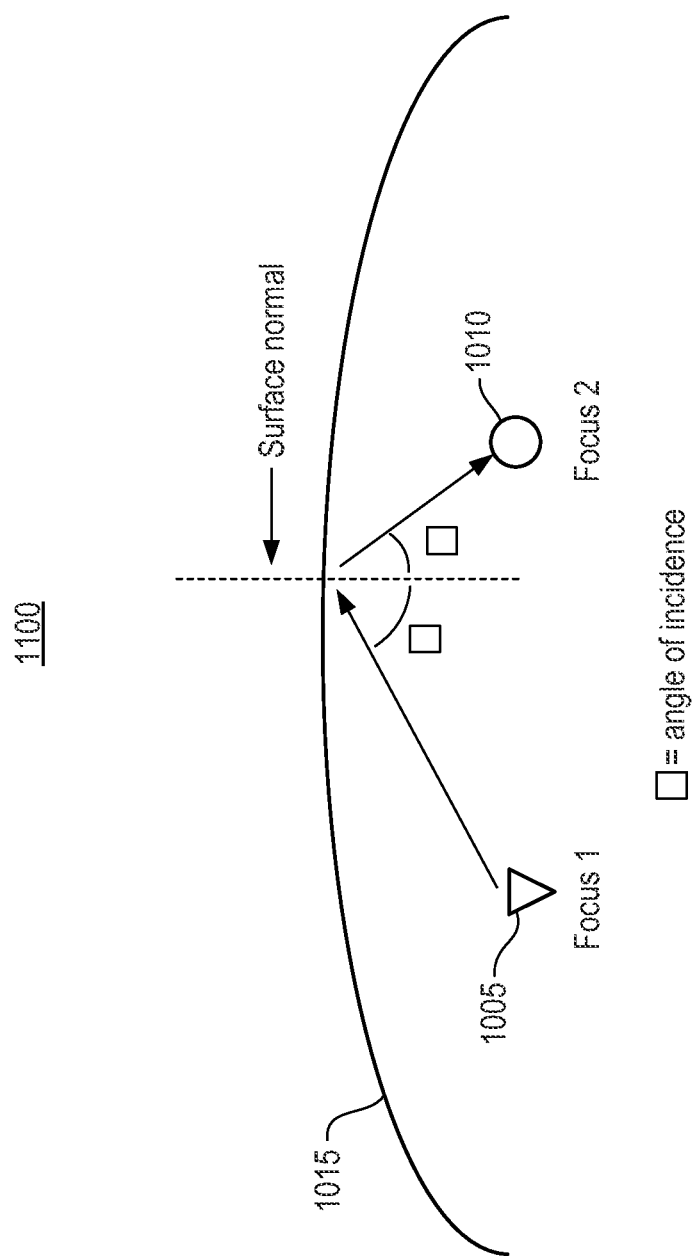
FIG. 11 illustrates a technique for determining eccentricity of metal dots at different locations of a beamsplitter shown in FIG. 10 according to a representative embodiment.

FIG. 11 illustrates a technique for determining eccentricity of metal dots at different locations of each curved beamsplitter 1015 according to a representative embodiment.

Referring to FIG. 11, a beam is transmitted from first device 1005 to curved beamsplitter 1015, and the beam arrives at curved beamsplitter 1015 with an angle of incidence indicated by a box. A portion of the beam also reflects from curved beamsplitter 1015 with an angle of reflection equal to the angle of incidence, as indicated by a box.

The angle of incidence or reflection can be calculated for any point on the ellipsoid shape of curved beamsplitter 1015. The calculated angle can then be used to determine the eccentricity of a metal dot at the relevant point. For example, the eccentricity can be determined from a lookup table that relates specific angles to specific eccentricity characteristics. In general, normal incidence corresponds to circular dots, and eccentricity tends to increase with the obliqueness (i.e., deviation from normal) of the angle. These relationships between incidence angle and eccentricity are similar to those described above in relation to a parabolic dome, except that a parabolic dome typically has metal dots with eccentricities that vary symmetrically about an apex. In addition, a prolate ellipsoid dome typically has metal dots with eccentricities that are aligned along an ellipse of revolution that defines the prolate ellipsoid. In other words, the metal dots may be formed as ellipses with major axes that extend parallel to the ellipse of revolution.

Figure 12:
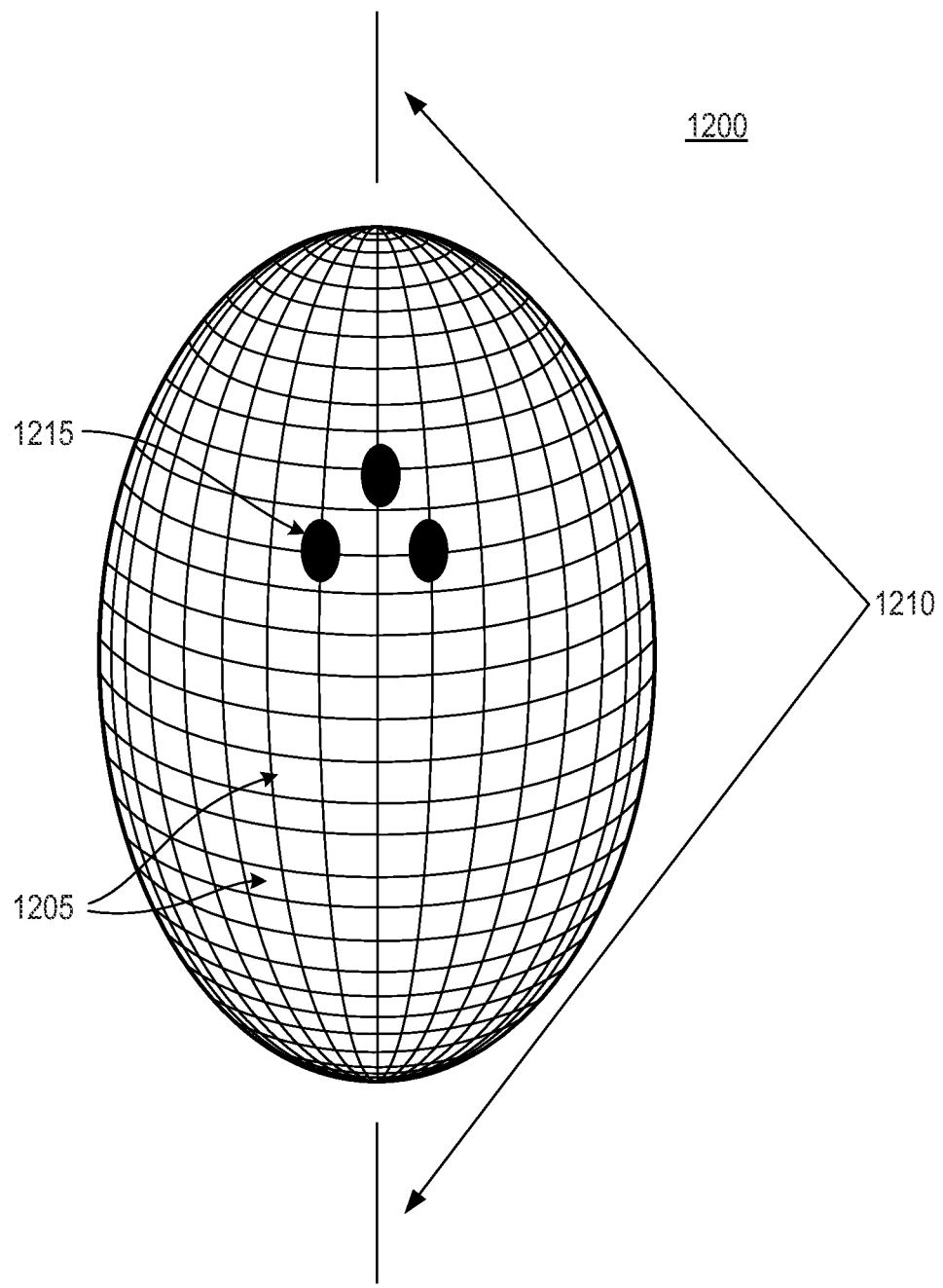
FIG. 12 shows an alignment of metal dots on a prolate ellipsoid dome according to a representative embodiment.

FIG. 12 shows an alignment of metal dots on a prolate ellipsoid dome 1200 according to a representative embodiment. In FIG. 12, the metal dots have eccentricities that are aligned with an ellipse of revolution of prolate ellipsoid dome 1200.

Referring to FIG. 12, prolate ellipsoid dome 1200 has a shape defined by an ellipse of revolution 1205. More particularly, the shape is defined by rotating ellipse of revolution 1205 about an axis of revolution 1210. For convenience, lines of latitude and longitude are drawn on prolate ellipsoid dome 1200 to indicate the orientation of ellipse of revolution 1205 at different angles of rotation.

Metal dots 1215 having elliptical shapes are placed on the surface of prolate ellipsoid dome 1200. These elliptical shapes have major axes that are aligned along the longitude lines, i.e., in a North-South direction. In other words, they are aligned with the ellipse of revolution of prolate ellipsoid dome 1200.

Figure 13:
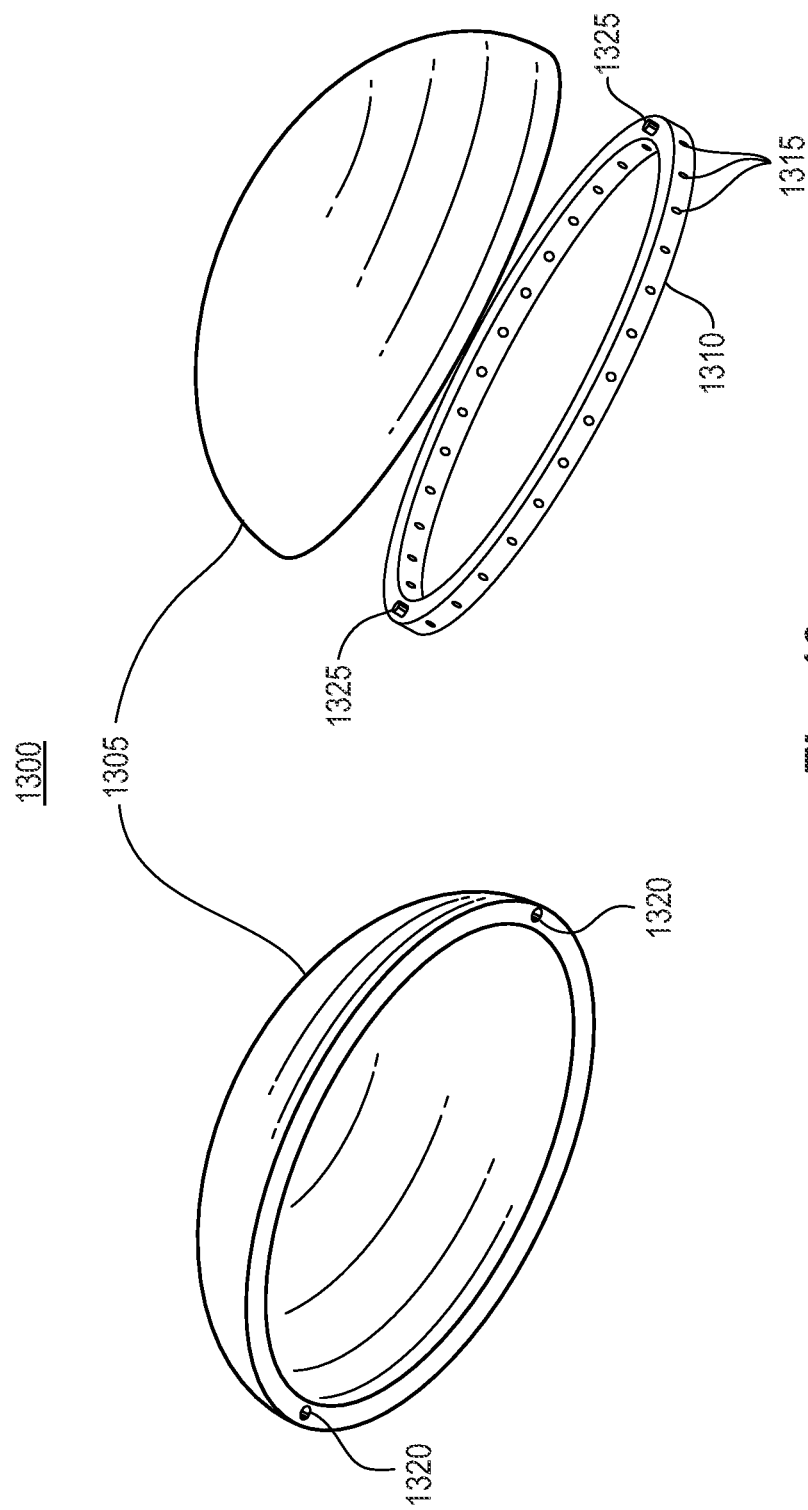
FIG. 13 shows an example of an ellipsoid dome that can be used to form the beamsplitter of FIG. 10 according to a representative embodiment.

FIG. 13 shows an example of an ellipsoid dome 1300 that can be used to form curved beamsplitter 1015 according to a representative embodiment. Ellipsoid dome 1300 typically comprises a hollow foam structure 1305 that serves as a support for an ultrathin flex circuit bearing metal dots such as those illustrated in FIG. 12.

Ellipsoid dome 1300 can be formed similar to parabolic dome 400 of FIG. 4, but with an ellipsoid shape rather than a parabolic shape. For example, ellipsoid dome 1300 can be formed of machinable foam such as Rohacell®, especially Rohacell 311G and 311G-F, which are ultra-low density closed cell foams. An elliptical rim 1310 with threaded holes 1315 is used to attach the flex circuit when it is draped over the dome. Elliptical rim 1310 can be aligned with hollow foam structure 1305 using alignment holes 1320 and corresponding alignment pins 1325. Elliptical rim 1310 need not be foam and can be made of a stronger material such as ABS.

Figure 14:
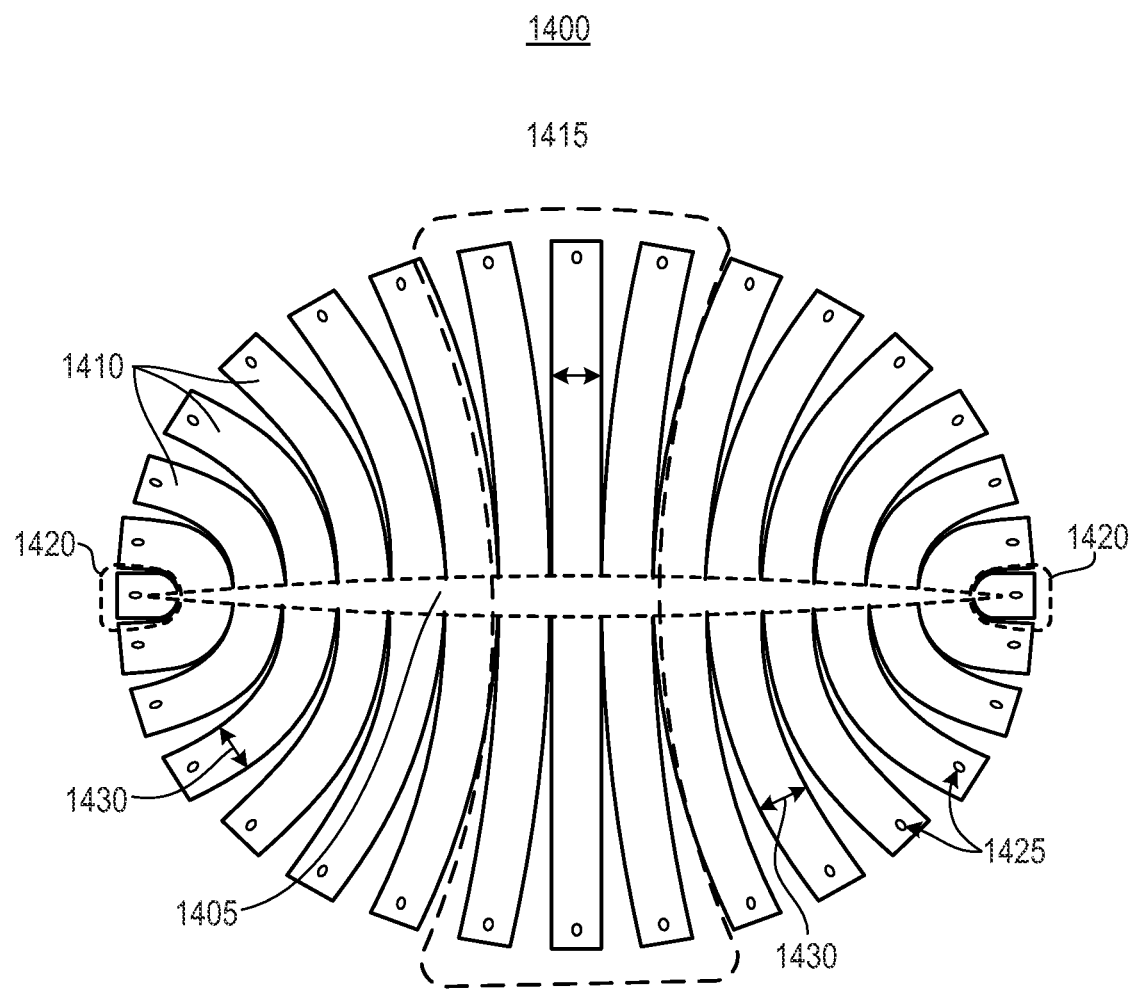
FIG. 14 shows a flex circuit for a beamsplitter in the form of a prolate ellipsoid according to a representative embodiment.

FIG. 14 shows a flex circuit 1400 according to a representative embodiment. The shape of flex circuit 1400 is designed to conform to an ellipsoid support structure such as hollow foam structure 1305 of FIG. 13.

Referring to FIG. 14, flex circuit 1400 comprises a longitudinal wedge 1405 with "latitude arc strips" or "wings" 1410 emanating from it. Wings 1410 are formed by arcs of a circle. Hence, their shape can be defined by radii, centers, and arc angles. These parameters can be calculated according to the desired mapping of wings 1410 onto the ellipsoid support structure.

Although not shown in FIG. 14, flex circuit 1400 typically comprises many elliptical metal dots. For instance, the surface of flex circuit 1400 may have tens of thousands of metal dots that are too small to see at the resolution of FIG. 14. The major axes of the elliptical metal dots are generally arranged perpendicular to wings 1410. An example of this perpendicular direction is illustrated by double headed arrows labeled 1430. The metal dots are generally more eccentric toward the center of longitudinal wedge 1405. For example, a region labeled 1405 comprises metal dots with relatively high eccentricity, and regions labeled 1420 comprise metal dots with relatively low eccentricity. A plurality of screw holes 1425 are formed in flex circuit. 1400 to attach it to attachment points such as screw holes 1315 of elliptical rim 1310.

Although the metal dots on flex circuit 1400 generally have different eccentricities, they can nevertheless be formed in a common lattice structure. For example, they can be arranged in a hexagonal lattice similar to that illustrated in FIGS. 6A-6C. Alternatively, they can be formed in a rectangular lattice or various other lattice configurations. As in the example of FIGS. 6A-6C, the lattice period is much smaller than the free-space wavelength λ, so the array of metal dots acts like a "meta-surface".

Figure 15:
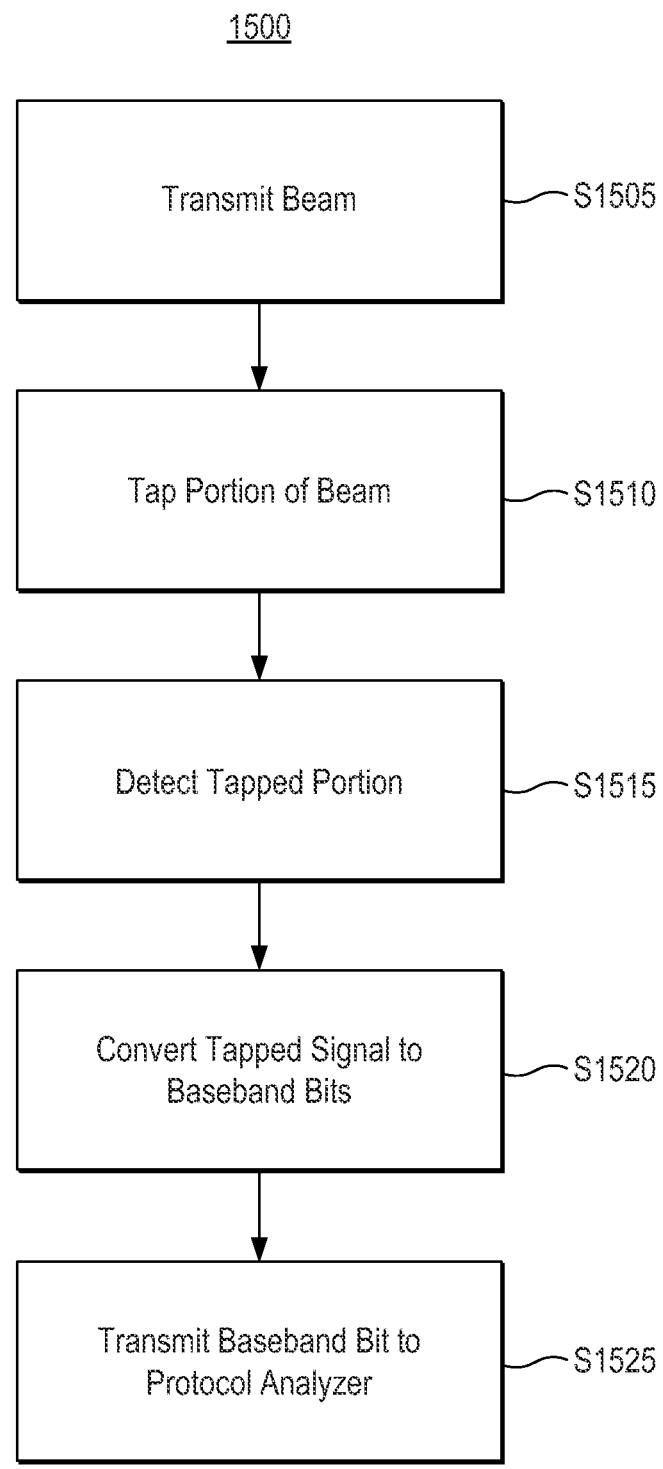
FIG. 15 is a flowchart illustrating a method of monitoring communication in a wireless network according to a representative embodiment.

FIG. 15 is a flowchart illustrating a method of monitoring communication in a wireless network using a sniffer system such as that illustrated in FIG. 10 according to a representative embodiment.

Referring to FIG. 15, abeam comprising an RF signal is transmitted from a first device toward a target using a directional antenna (S1505). A portion of the transmitted beam is reflected, or tapped, by a beamsplitter such as that illustrated in FIG. 10, toward a second device comprising an omnidirectional antenna (S1510). The reflected portion is detected by the omnidirectional antenna (S1515) and converted to baseband bits by a downconverter and demodulator within the second device (S1520). Finally, the baseband bits are retransmitted over a wired star network to a protocol analyzer or central packet analyzer (S1525). The protocol analyzer or central packet analyzer can then examine the received baseband bits in conjunction with other information to determine whether the first device is operating in a desired manner, e.g., whether it is operating according to a defined communication protocol.

As indicated by the description of FIGS. 10-15, a curved beamsplitter can be used to implement a sniffer in the context of a wireless LAN network where transmitting and receiving devices use directional antennas. This allows the sniffer to monitor communications even if it is not directly in the path of a transmitted beam. The ability to monitor communications in this manner may allow a protocol analyzer or other component to efficiently confirm interoperability of the devices and determine whether they are behaving in a desired manner, among other things.

While representative embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A system configured to monitor communication in a wireless network, comprising:
   a sniffer device comprising a first antenna; and
   a beamsplitter having a curved shape and configured to reflect a portion of a beam transmitted by a second antenna toward the first antenna while transmitting a remaining portion of the beam toward a target.

2. The system of claim 1, wherein the first antenna is an omnidirectional antenna and the second antenna is a directional antenna.

3. The system of claim 1, wherein the curved shape comprises at least part of a prolate ellipsoid, the first antenna is located at a first focus of the ellipsoid, and the second antenna is located at a second focus of the ellipsoid.

4. The system of claim 1, wherein the beamsplitter comprises a flex circuit having a reflective pattern.

5. The system of claim 4, wherein the reflective pattern comprises a plurality of dots formed of a reflective material.

6. The system of claim 5, wherein the reflective material is metal.

7. The system of claim 5, wherein the dots are arranged in a hexagonal or rectangular lattice.

8. The system of claim 5, wherein the dots comprise ellipses.

9. The system of claim 8, wherein the curved shape comprises a prolate ellipsoid defined in relation to an ellipse of revolution, and the ellipses have major axes aligned with the ellipse of revolution.

10. The system of claim 8, wherein the curved shape comprises an ellipsoid and each of the ellipses has an ellipticity determined by an angle of incidence of a geometric optics ray emanating from the first device located at a first focus of the ellipsoid.

11. The system of claim 10, wherein ellipses located near a pole of the ellipsoid have relatively low ellipticity and ellipses located near an equator of the ellipsoid have relatively high ellipticity.

12. The system of claim 1, wherein the beamsplitter comprises a support structure comprising a hollow foam structure having a prolate ellipsoid shape.

13. The system of claim 1, wherein the sniffer device further comprises a downconverter and demodulator configured to receive from the first antenna a signal corresponding to the reflected portion of the beam and to convert the intercepted radio signal to baseband bits.

14. The system of claim 13, wherein the sniffer device is configured to transmit the baseband bits over a wired star network to a protocol analyzer.

15. A method of monitoring communication in a wireless network, comprising:
   transmitting a beam comprising a radio frequency signal from a first device toward a target using a first antenna;
   reflecting a portion of the transmitted beam from a reflective pattern on a curved beamsplitter toward a second device comprising a second antenna while transmitting a remaining portion of the beam through the beamsplitter toward the target.

16. The method of claim 15, wherein the curved beamsplitter has a shape corresponding to at least a part of a prolate ellipsoid, the first device is located at a first focus of the ellipsoid, and the second device is located at a second focus of the ellipsoid.

17. The method of claim 15, wherein the reflective pattern comprises a plurality of reflective dots each having an ellipticity determined according to its location on the curved beamsplitter.

18. The method of claim 15, further detecting the portion of the transmitted beam at the second antenna, converting the detected portion to baseband bits through operation of a downconverter and demodulator within the second device.

19. The method of claim 18, further comprising retransmitting the baseband bits to a protocol analyzer.

20. The method of claim 19, further comprising analyzing the baseband bits in the packet analyzer to determine whether the first device is operating according to a communication protocol of the wireless network.

* * * * *